United States Patent [19]
Wong et al.

[11] Patent Number: 5,835,727
[45] Date of Patent: Nov. 10, 1998

[54] METHOD AND APPARATUS FOR CONTROLLING ACCESS TO SERVICES WITHIN A COMPUTER NETWORK

[75] Inventors: Thomas K. Wong, Pleasanton; Sanjay R. Radia, Fremont; Swee Boon Lim, Cupertino; Panagiotis Tsirigotis, Mountain View; Robert J. Goedman, Palo Alto, all of Calif.

[73] Assignee: Sun Microsystems, Inc., Palo Alto, Calif.

[21] Appl. No.: 762,393

[22] Filed: Dec. 9, 1996

[51] Int. Cl.$^6$ .............................. H04L 12/46; H04L 12/26
[52] U.S. Cl. ............................... 395/200.68; 395/200.57; 370/85.13; 370/230; 370/241
[58] Field of Search ......................... 395/200.54, 200.68, 395/200.57; 370/85.13, 230, 241

[56] References Cited

U.S. PATENT DOCUMENTS

| | | | |
|---|---|---|---|
| 5,463,777 | 10/1995 | Bialkowski et al. | 395/601 |
| 5,530,703 | 6/1996 | Liu et al. | 370/85.13 |
| 5,541,911 | 7/1996 | Nilakantan et al. | 370/13 |
| 5,570,366 | 10/1996 | Baker et al. | 370/85.13 |
| 5,572,533 | 11/1996 | Sunada et al. | 371/20.1 |
| 5,574,910 | 11/1996 | Bialkowski et al. | 395/601 |
| 5,627,829 | 5/1997 | Gleeson et al. | 370/230 |
| 5,648,965 | 7/1997 | Thadani et al. | 370/241 |

FOREIGN PATENT DOCUMENTS

| | | |
|---|---|---|
| 0442838 | 8/1991 | European Pat. Off. . |
| 0658837 | 6/1995 | European Pat. Off. . |

OTHER PUBLICATIONS

Brent D. Chapman, Elizabeth D. Zwicky, Building Internet Firewalls, Chapter 6 "Packet Filtering," pp. 131–188, (O'Reilley & Associates, 1995).

R. Droms, "Dynamic Host Configuration Protocol", *RFC 1541*, Bucknell University, Oct. 1993.

Fred Simonds, Network Security Data and Voice Communications, Chapter 10 "Firewalls: TCP/IP and Internet Security," pp. 215–268, (McGraw–Hill, 1996).

*Primary Examiner*—Krisna Lim
*Attorney, Agent, or Firm*—Graham & James LLP

[57] ABSTRACT

A method and apparatus for controlling access to services within a computer network is provided. More specifically, the present invention includes a services management system, or SMS. The SMS manages network connections between a series of client systems and a router. An access network control server (ANCS) manages the configuration of the router. For each network user, the SMS maintains a profile of filtering rules. When the user accesses the network, the SMS downloads the user's filtering profiles to the ANCS. The ANCS then uses the downloaded filtering profiles to reconfigure the router. The router then uses the filtering rules to selectively forward IP packets originating from the user's host system and directed at the network services.

18 Claims, 5 Drawing Sheets

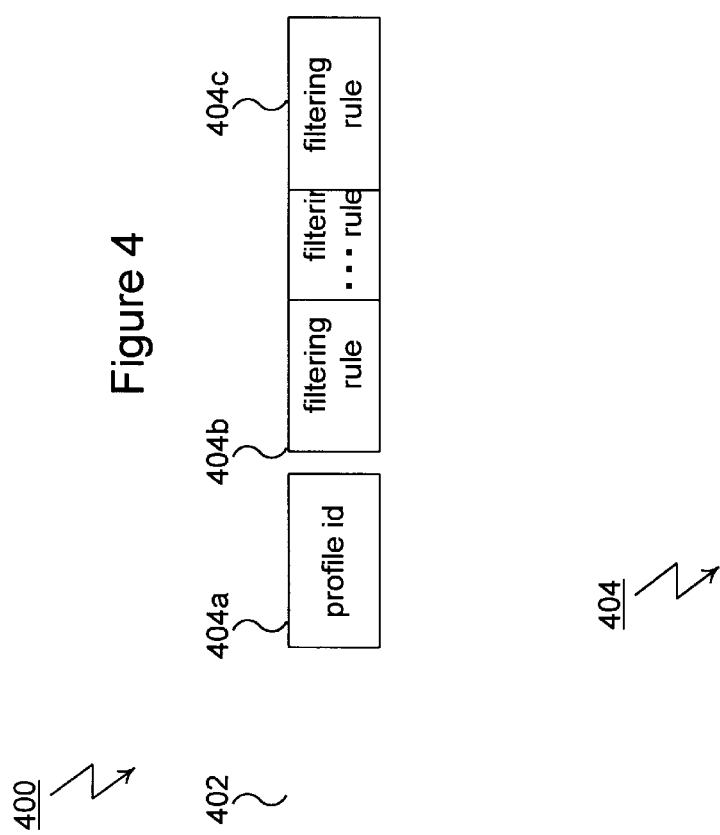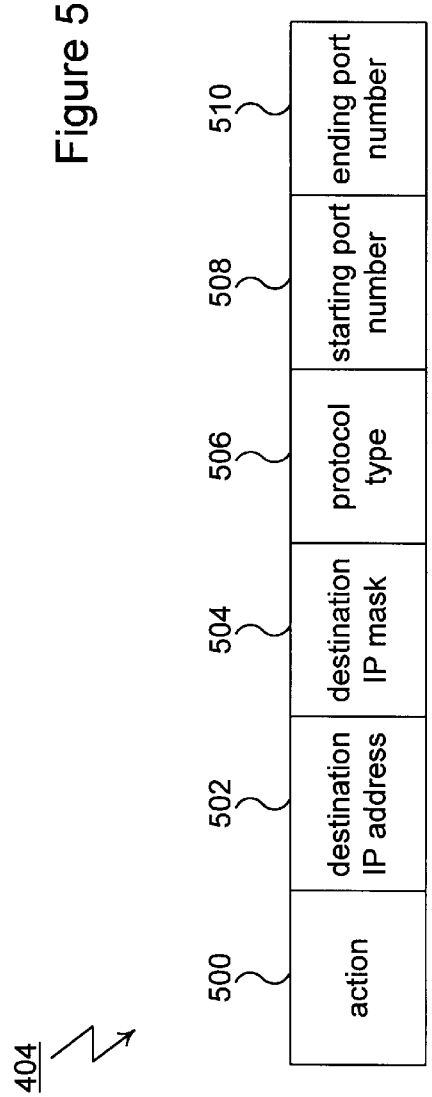

METHOD AND APPARATUS FOR CONTROLLING ACCESS TO SERVICES WITHIN A COMPUTER NETWORK

RELATED APPLICATIONS

The following co-pending patent applications, which were filed on Dec. 9, 1996, are related to the subject application and are herein incorporated by reference:
1. Application Ser. No. 08/763,234, entitled "Method and Apparatus for Client-Sensitive Name Resolution Using DNS" of Swee Boon Lim, Sanjay R. Radia, Thomas Wong and Michael W. Patrick.
2. Application Ser. No. 08/762,402, entitled "Method and Apparatus for Dynamic Packet Filter Assignments" of Sanjay R. Radia, Swee Boon Lim, Panagiotis Tsirigotis, Thomas Wong, and Rob Goedman.
3. Application Ser. No. 08/763,289, entitled "Load Balancing and Failover of Network Services" of Swee Boon Lim, Ashish Singhai, and Sanjay R. Radia.
4. Application Ser. No. 08/763,068, entitled "Secure DHCP Server" of Swee Boon Lim, Sanjay R. Radia, Thomas Wong, Panagiotis Tsirigotis, and Rob Goedman.
5. Application Ser. No. 08/763,212, entitled "A Method to Activate Unregistered Systems in a Distributed Multiserver Network Environment" of Thomas Wong and Sanjay R. Radia.
6. Application Ser. No. 08/762,709, entitled "A Method and Apparatus for Assignment of IP Addresses" of Thomas Wong, Swee Boon Lim, Sanjay R. Radia, Panagiotis Tsirigotis, Rob Goedman and Michael W. Patrick.
7. Application Ser. No. 08/762,933, entitled "A Method for Using DHCP to Override Learned IP Addresses in a Network" of Sanjay R. Radia, Thomas Wong, Swee Boon Lim, Panagiotis Tsirigotis, Rob Goedman, and Mike Patrick.
8. Application Ser. No. 08/762,705, entitled "Dynamic Cache Preloading Across Loosely Coupled Administrative Domains" of Panagiotis Tsirigotis and Sanjay R. Radia.

The following co-pending patent application is related to the subject application and is herein incorporated by reference:
9. U.S. application Ser. No. 08/673,951, filed Jul. 1, 1996, entitled "A Name Service for a Redundant Array of Internet Servers" of Swee Boon Lim.

FIELD OF THE INVENTION

The present invention relates generally to security in computer networks. More specifically, the present invention is a method and apparatus that provides access control for applications in a multiserver network environment.

BACKGROUND OF THE INVENTION

For many computer networks, the ability to provide controlled access to objects, such as applications and data, is an important requirement. The need for effective access control increases, in most cases, with increasing network size and with increasing numbers and types of network users. A first approach to access control has been to build access control systems into the applications for which controlled access is required. With this approach, the applications authenticate each user prior to responding to the user's requests. In practice, this method has been found to be somewhat difficult to implement, due largely to the fact that modifications must be made to each application requiring access control.

A second approach to access control has been the use of proxy servers. Proxy servers are programs that act as middlemen between network users and applications requiring access control. When a user sends a request to an application, the request goes first to the proxy server. The proxy server then authenticates the user's request and either forwards the request to the application or discards the request. Access control using proxy servers is an effective method that reduces the changes that must be made to the applications requiring access control. As a result, the use of proxy servers is often preferred over the use of access control systems built-in to applications. Unfortunately, experience has shown that, as network grow in scale, the use of proxy servers tends to be somewhat of a bottleneck since each user request must pass through the proxy server.

As a result, there is a need for access control systems that provide high-throughput and may be implemented without modifications to the applications requiring controlled access.

SUMMARY OF THE INVENTION

A preferred embodiment of the present invention includes a method and apparatus for controlling access to services within a computer network. More specifically, a preferred environment for the present invention is a computer network that includes a series of server systems, a series of client systems and one or more routers. An access network control server (ANCS) controls configuration of the network components and a services management system (SMS), dynamically reconfigures the ANCS. The network also includes a DHCP server that implements the Dynamic Host Configuration Protocol (DHCP) defined in Internet RFC 1541. The client systems, which are typically personal computers using cable modems, connect to the router. As part of the connection process, each client system receives a dynamically allocated IP address from the DHCP server.

Within the network, certain software applications are included within logical groups known as "services." Each application within a service is available from one or more server systems. Network users who wish to access one of these applications subscribe to the service that includes the application. The SMS maintains a filtering profile for each service. Each filtering profile includes one or more filtering rules. Each filtering rule is designed to forward IP packets that are directed at the applications within the services. Network users are assigned sequences of filtering profiles. Each filtering profile included in a user's filtering profile sequence corresponds to one of the services to which the user subscribes.

Network users login to the network using one of the client systems as a host. As part of the login process, the SMS authenticates the user using a password or other authentication method. Subsequently, the SMS locates the user's filtering profile sequence. The user's filtering profile sequence is then downloaded by the SMS to the ANCS. The ANCS uses the rules included in the downloaded filtering profile sequence to establish a packet filter for IP packets originating from the user's host system. The new packet filter is preferably established by reconfiguring the components of the network that forward IP packets originating at the user's host system. For example, the packet filter may be established by reconfiguring the router that connects the user's host system to the network. Alternatively, the packet filter may be established by reconfiguring the cable modem that connects the user's host system to the router.

Subsequently, the new packet filter uses the rules of the user's filtering profile sequence to selectively forward or discard IP packets originating from the user's host system. Specifically, the packet filter forwards packets that are directed to the services to which the user subscribes. Packets that are directed at services that the user is not authorized to use are discarded.

In accordance with the purpose of the invention, as embodied and broadly described herein, the present invention is a method for providing access control to services in a computer network including one or more server systems and one or more client systems, the method comprising the steps of: providing a filtering profile for each service, each filtering profile including one or more filtering rules, establishing the identity of a network user that is using a host client system, selecting one of more filtering profiles in accordance with the identity of the network user, and establishing a packet filter in the computer network, the packet filter using the filtering rules included in the selected profiles to selectively forward packets originating at the host client system and directed at one or more of the services included in the network.

In further accordance with the purpose of the invention, as embodied and broadly described herein, the present invention is a computer program product comprising: a computer usable medium having computer readable code embodied therein for providing access control to services in a computer network including one or more server systems and one or more client systems, the computer program product comprising: first computer readable program code devices configured to cause a computer system to maintain a filtering profile for each service, each filtering profile including one or more filtering rules, second computer readable program code devices configured to cause a computer system to establishing the identity of a network user that is using a host client system, third computer readable program code devices configured to cause a computer system to select one of more filtering profiles in accordance with the identity of the network user, and fourth computer readable program code devices configured to cause a computer system to establish a packet filter in the computer network, the packet filter using the filtering rules included in the selected profiles to selectively forward packets originating at the host client system and directed at one or more of the services included in the network.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 4 is a block diagram of a filtering profile used in a preferred embodiment of the present invention.

FIG. 5 is a block diagram of a filtering rule as used in a preferred embodiment of the present invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
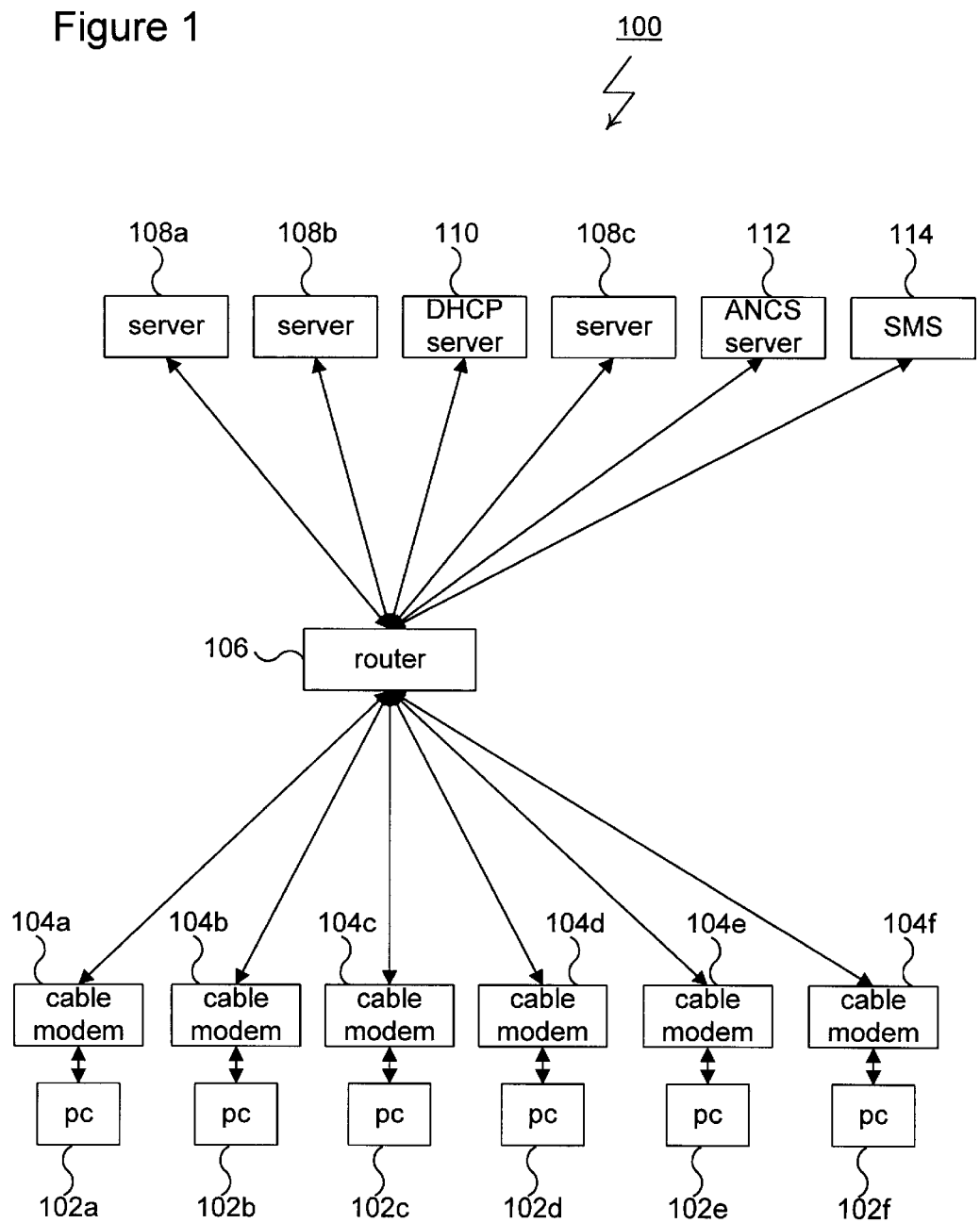
FIG. 1 is a block diagram of a computer network shown as a representative environment for a preferred embodiment of the present invention.

In FIG. 1, a computer network 100 is shown as a representative environment for the present invention. Structurally, computer network 100 includes a series of client systems 102, of which client systems 102a through 102f are representative. Each client system 102 may be selected from a range of differing devices including, but not limited to the personal computers shown in FIG. 1. Preferably, each client system 102 is limited to use by a single user at any given time. A cable modem 104 is connected to each client system 102. Each cable modem 104 is connected, in turn, to a cable router 106. The use of cable router 106 and cable modems 104 is also intended to be exemplary and it should be appreciated that other networking technologies and topologies are equally practical. It should also be appreciated that a number of different cable modems and cable routers are available from various manufactures. In particular, cable modem 104 can be a CyberSUFR cable modem and cable router 106 can be a CableMASTR cable router, both supplied by Motorola, Inc.

Network 100 also includes a series of server systems 108, of which server systems 108a through 108c are representative. Each server system 108 is connected to cable router 106. Generally, server systems 108 are intended to represent the broad range of server systems that may be found within computer networks.

A DHCP server system 110 is also included in computer network 100 and connected to cable router 106. DHCP server system 110 is a computer or other system that implements Dynamic Host Configuration Protocol (DHCP) defined in Internet RFC 1541, which is incorporated herein by reference. Functionally, DHCP server system 110 provides for allocation of IP addresses within network 100. When client systems 102 initially connect to cable router 106, each client system 102 requests and receives an IP address from DHCP server system 110. Although FIG. 1 shows only a single DHCP server system 110, it is to be understood that additional DHCP server systems 110 may be used without departing from the spirit of the present invention.

Figure 2:
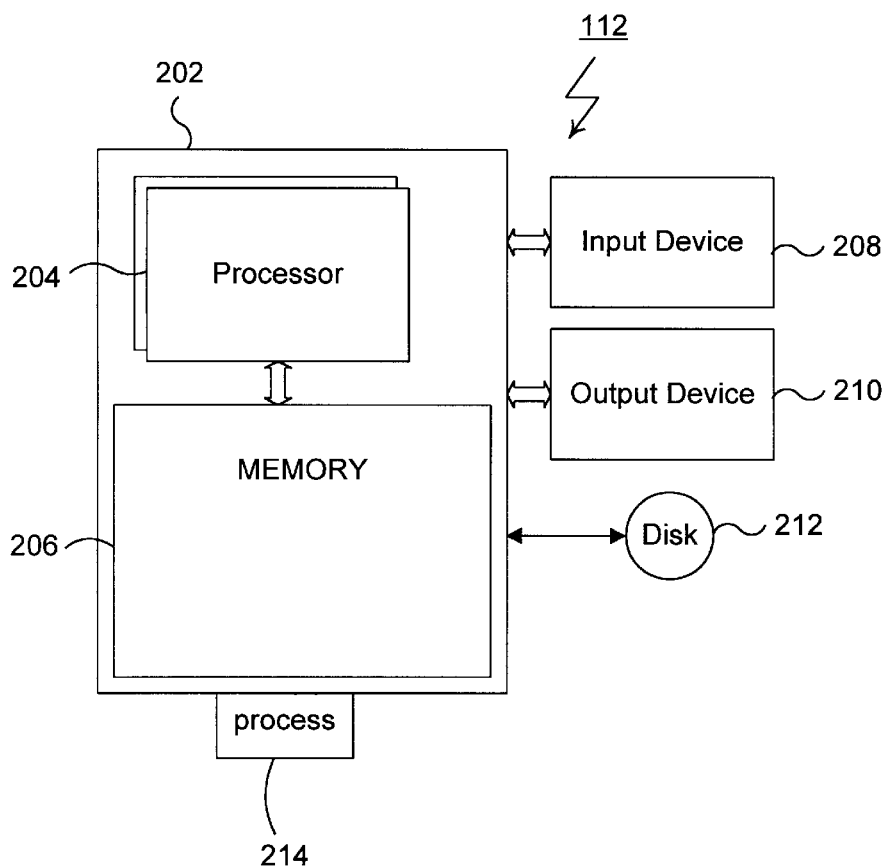
FIG. 2 is a block diagram of an access network control server (ANCS) as used by a preferred embodiment of the present invention.

Computer network 100 also includes an access network control server (ANCS) 112 and a services management system (SMS) 114. Both ANCS 112 and SMS 114 are connected to cable router 106. ANCS 112 is shown in more detail in FIG. 2 to include a computer system 202 that, in turn, includes a processor or processors 204 and a memory 206. An input device 208 and an output device 210 are connected to the computer system 202 and represent a wide range of varying I/O devices such as disk drives, keyboards, modems, network adapters, printers and displays. A disk drive 212, of any suitable disk drive type, is shown connected to computer system 202. An ANCS process 214 is shown to be resident in memory 206 of computer system 202.

Figure 3:
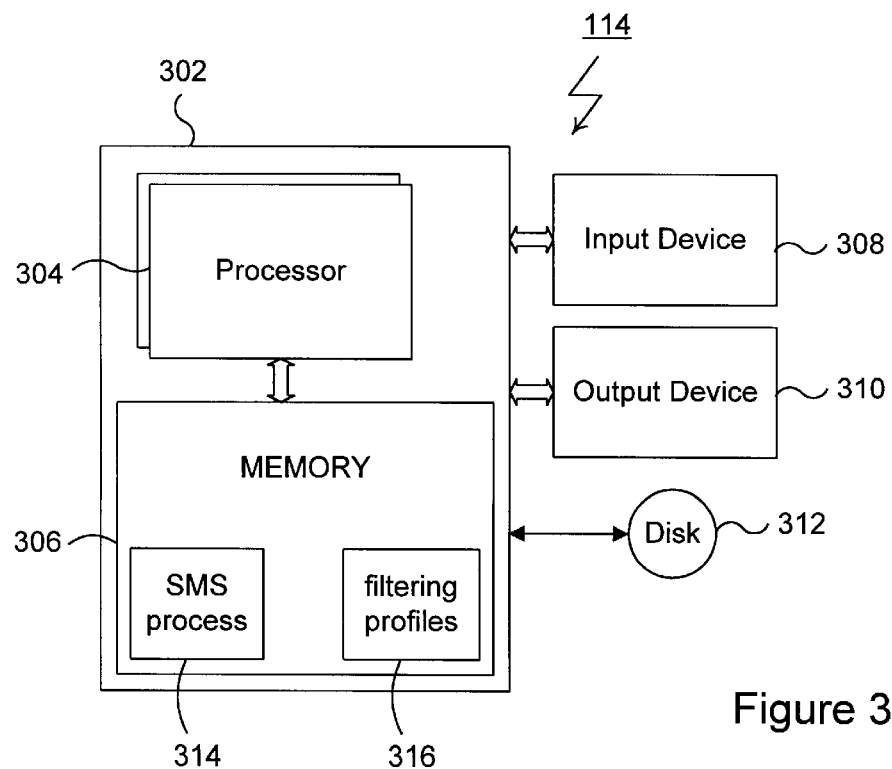
FIG. 3 is a block diagram of a services management system (SMS) as used by a preferred embodiment of the present invention.

SMS 114 is shown in more detail in FIG. 3 to include a computer system 302 that, in turn, includes a processor or processors 304 and a memory 306. An input device 308 and an output device 310 are connected to the computer system 302 and represent a wide range of varying I/O devices such as disk drives, keyboards, modems, network adapters, printers and displays. A disk drive 312, of any suitable disk drive type, is shown connected to computer system 302. An SMS process 314 and a filtering profile database 316 are shown to be resident in memory 306 of computer system 302. In FIG. 1, ANCS 112 and SMS 114 are shown as separate entities. It should be appreciated, however, that the present invention specifically anticipates that ANCS 112 and SMS 114 may be implemented using a single computer system that includes ANCS process 214, SMS process 314 and filtering profile database 316.

Within network 100, certain software applications are included in logical groups known as services. As an example, network 100 could include an application that provides continuous updates of sporting events. This applications could be included in a sports news service. Network users who wish to use a specific application subscribe to the service that includes the application. Thus, users desiring to have continuous updates of sporting events would subscribe to the sports news service. In general, the applications included in a service may be available from one or more of the server systems 108 included in network 100. Popular services would typically be available from multiple server systems 108 while less popular services might be available from only a single server system 108.

Within SMS 114, each service has a filtering profile of the type shown in FIG. 4 and generally designated 400. Filtering profile 400 includes a profile id 402 and a series of filtering rules, of which filtering rules 404a through 404c are representative. The filtering rules 404 included in a filtering profile 400 are better understood by reference to FIG. 5. In FIG. 5, it may be seen that each filtering rule 404 includes an action 500. Action 500 specifies the disposition of IP packets are match by a particular filtering rule 404. In particular, action 500 may indicate that a matched IP packet will be forwarded, or that a matched IP packet will be discarded. Filtering rule 404 also includes a destination IP address 502 and a destination IP mask 504. Destination IP address 502 corresponds to the destination address included in the header of an IP packet. Destination IP mask 504 is similar to destination IP address 502 but corresponds to a range of destination IP addresses. To match a particular filtering rule 404, an IP packet must either have a destination address that matches the destination address 502 included in the filtering rule 404 or have a destination address that is included in the range of destination address mask 504 of the filtering rule 404.

Filtering rule 404 also includes a protocol type 506. Protocol type 506 corresponds to the protocol type of an IP packet. Thus, the protocol type 506 of each filtering rule 404 has a value that corresponds to an IP packet type, such as TCP, UDP, ICMP, etc. To match a particular filtering rule 404, an IP packet must have a protocol type that matches the protocol type 506 included in the filtering rule 404.

Finally, for the embodiment shown, filtering rule 404 includes a starting port number 508 and an ending port number 510. Starting port number 508 and ending port number 510 define a range of port numbers of the type used by certain protocols, such as UDP and TCP. To match a particular filtering rule 404, an IP packet of one of these types must have a port number that falls within the range defined by starting port number 508 and ending port number 510.

Figure 6:
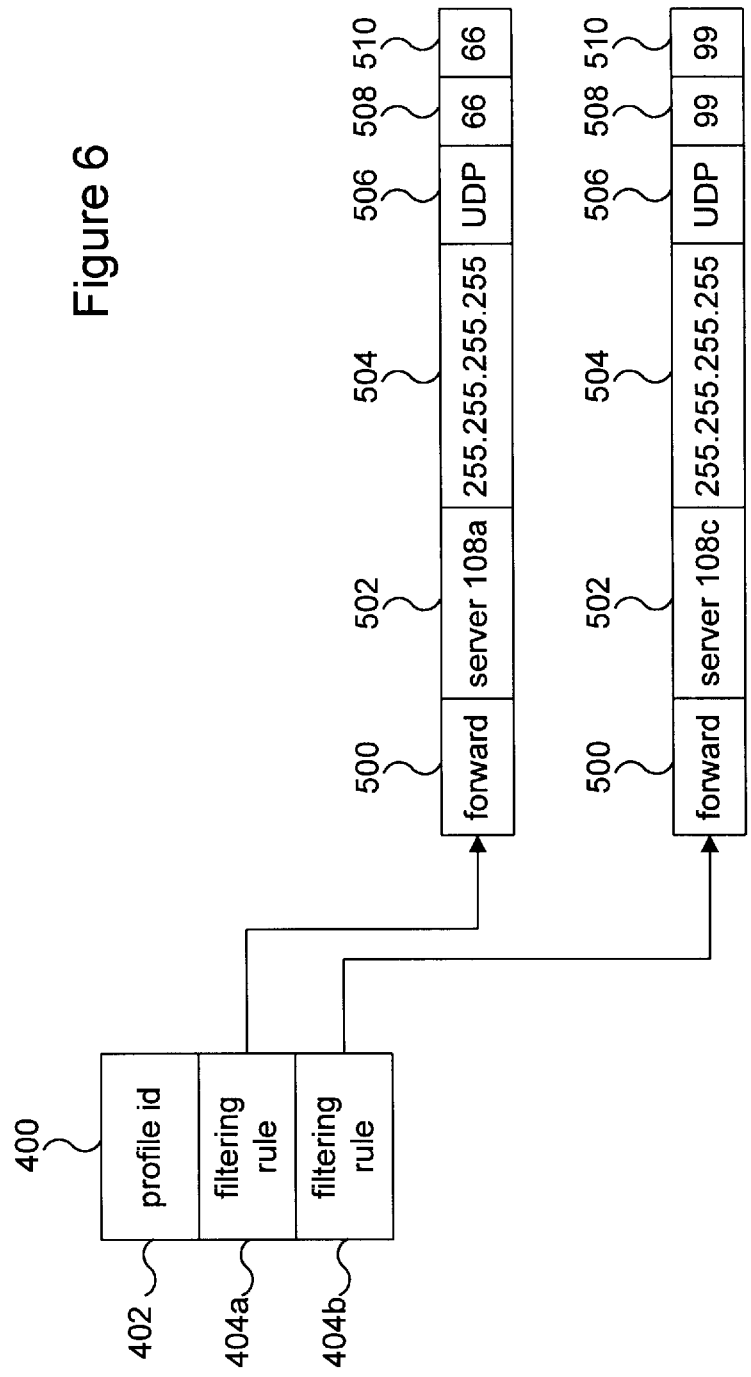
FIG. 6 is a block diagram showing an exemplary filtering profile associated with a service as provided by the present invention.

An example of a filtering profile 400 for the exemplary sports news service is shown in FIG. 6. More specifically, in FIG. 6, filtering profile 400 includes two filtering rules, 404a and 404b respectively. Filtering rule 404a includes an action 500 indicating that IP packets that match the filtering rule 404a should be forwarded. Additionally, filtering rule 404a includes a destination address 502 that corresponds to the IP address of server system 108a. The destination address mask 504 of filtering rule 404a is set to 255.255.255.255 and the protocol type 506 of filtering rule 404a is set to UDP. Finally, the starting port number 508 and ending port number 510 of filtering rule 404a are both set to 66.

For filtering rule 404b, an action 500 is included that indicates that IP packets that match the filtering rule 404b should be forwarded. Additionally, filtering rule 404b includes a destination address 502 that corresponds to the IP address of server system 108c. The destination address mask 504 of filtering rule 404b is set to 255.255.255.255 and the protocol type 506 of filtering rule 404b is set to UDP. Finally, the starting port number 508 and ending port number 510 of filtering rule 404b are both set to 99.

Based on the foregoing, it may be concluded that the sports news service is available from server systems 108a and 108c. The application that provides continuous updates of sporting events is accessed using the UDP protocol. In the case of server system 108a, the application is accessed using port 66. In the case of server system 108c, a port address of 99 is used.

Within SMS 114, each network user has a filtering profile sequence. These filtering profiles 400 are maintained in filtering profile database 316 and are retrievable by SMS 114 using the user's identity within network 100. The filtering profiles 400 that are included in a user's filtering profile sequence correspond to the services to which the user subscribes. Thus, if a user were to subscribe to the sports news services, his filtering profile sequence would include the filtering profile 400 shown in FIG. 6. The user's filtering profile sequence would also include filtering profiles for any other services to which the user subscribes.

Figure 7:
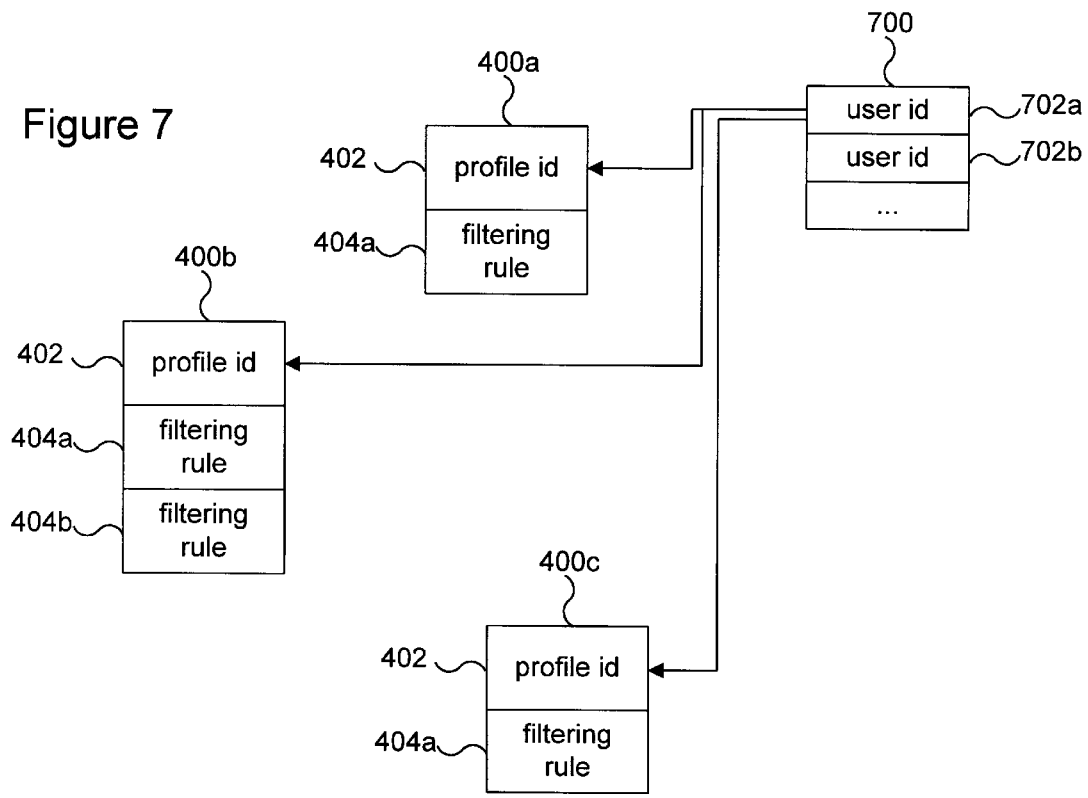
FIG. 7 is a block diagram showing the correspondence between a network user and a sequence of filtering profiles as provided by the present invention.

The association between network users and filtering profiles 400 may be better understood by reference to FIG. 7. In FIG. 7 an index 700 is shown for filtering profile database. Index 700 has one entry 702 for each network user. Each entry 702 references the filtering profiles 400 that correspond to the services to which the network user subscribes. Thus entry 702a references filtering profiles 400a and 400b. This allows the sequence of filtering profiles associated with network users to be retrieved.

Figure 8:
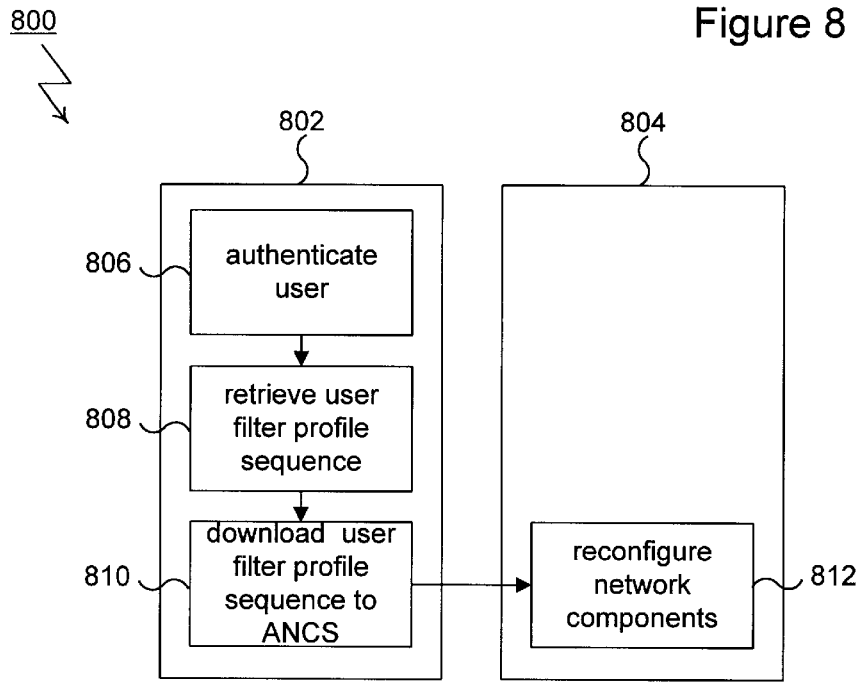
FIG. 8 is a flowchart showing the steps associated with a preferred embodiment of a method for providing access control in a computer network.

A preferred embodiment for access control is shown as method 800 of FIG. 8. Method 800 includes step performed by SMS 114 and ANCS 112. For convenience, these steps are grouped into an SMS context 802 and an ANCS context 804. Method 800 begins with step 806 where SMS 114 authenticates a network user. More specifically, for a preferred embodiment of the present invention, users access the network 100 by using a host client system 102. To prevent misuse of the network 100, SMS 114 authenticates each user using a password or other authentication scheme. The authentication process also informs the SMS 114 of the identity of the user. Step 806 corresponds, in a general sense, to the methods and procedures that are executed by SMS 114 to authenticate and identify a network user.

In step 808, which follows, SMS 114 locates the user's filtering profile sequence within the filtering profile database 316. In general, this step is performed by searching the index 700 of filtering profile database 316 using the user's identity as a search key. The user's identity may be, for example, a user name or identification number. In some cases, such as in the case of a new user, a default filtering profile sequence may be generated using a standardized template.

Step 808 is followed by step 810, where the user's filtering profile sequence is downloaded by SMS 114 to ANCS 112. At the same time, the SMS 114 passes the IP address of the user's host system 102 to the ANCS 112. In the following step, the ANCS 112 uses each of the filtering rules 404 included in the user's filtering profile sequence to establish a packet filter for IP packets originating from the user's host system 102. The packet filter is established by reconfiguring one or more of the components of the network 100 that forward packets originating at the user's host system 102. For example, in some cases, the packet filter may be established by reconfiguring the modem 104 connected to the user's host system 102. Alternatively, the packet filter may be established by reconfiguring router 106. Preferably, ANCS 112 reconfigures the network components using a standardized protocol that may be used in combination with the components of network 100.

Subsequently, the packet filter established by the ANCS 112 is used to filter IP packets that originate from the user's host system 102, allowing those packets that are directed to the services to which the user subscribes. More specifically, the packet filter established by the SMS 114 examines each IP packet that originates at the user's host system 102. As part of this evaluation, the packet filter starts with the first filtering rule 404 included in the user's filtering profile sequence. This first filtering rule 404 is compared to the IP header of the IP packet. If the destination IP address 502, destination IP mask 504, protocol type 506 and the range defined by the starting port number 508 and ending port number 510 all match the header of the IP packet, the filtering rule 404 matches the IP packet. The packet filter then applies the action 500 included in the filtering rule 404. If the first filtering rule 404 included in the user's filtering profile sequence does not match, the remaining filtering rules 404 are tried in order. If no filtering rule matches, the IP packet is discard.

Subsequently, the user may change the services to which he or she subscribes. In this event, SMS 114 may re-download the user's filtering profile to the ANCS 112 allowing the ANCS 112 to reconfigure the network 100 to reflect the user's new subscriptions. The user's filtering profile may be also be re-downloaded if a server system 108 is added or becomes unavailable or in response to any other relevant event within network 100.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for providing access control to services in a computer network including one or more server systems and one or more client systems, the method comprising the steps of:

providing a filtering profile for each service, each filtering profile including one or more filtering rules, establishing the identity of a network user that is using a host client system, selecting one of more filtering profiles in accordance with the identity of the network user, and establishing a packet filter in the computer network, the packet filter using the filtering rules included in the selected profiles to selectively forward packets originating at the host client system and directed at one or more of the services included in the network.

2. A method as recited in claim 1 wherein the computer network includes a router and wherein the step of establishing a packet filter includes the step of reconfiguring the router to selectively forward packets originating at the host client system in accordance with the filtering rules included in the selected profiles.

3. A method as recited in claim 1 wherein the host client system is connected to the network using a cable modem and wherein the step of establishing a packet filter includes the step of reconfiguring the cable modem to selectively forward packets originating at the host client system in accordance with the filtering rules included in the selected profiles.

4. A method as recited in claim 1 wherein the step of providing one or more filtering profiles further comprises the step of selecting the filtering profiles from a database.

5. A method as recited in claim 1 wherein each service includes one or more applications, each application being located on one or more servers systems and wherein the filtering profile for each service includes one or more filtering rules for selectively forwarding packets directed to servers on which the applications of the service are located.

6. A method as recited in claim 1 wherein each filtering rule includes a protocol type, the protocol type corresponding to the protocol used to send messages to one of the services.

7. A method as recited in claim 1 wherein each filtering rule includes a destination address where the destination address corresponds to the IP address of one of the server systems.

8. A method as recited in claim 5 wherein each filtering rule includes a destination mask.

9. A method as recited in claim 5 wherein each filtering rule includes a range of destination port numbers.

10. A method as recited in claim 5 wherein the step of selecting one of more filtering profiles in accordance with the identity of the network user selects filtering profiles corresponding to services to which the user is a subscriber.

11. A computer program product comprising:

a computer usable medium having computer readable code embodied therein for providing access control to services in a computer network including one or more server systems and one or more client systems, the computer program product comprising:

first computer readable program code devices configured to cause a computer system to maintain a filtering profile for each service, each filtering profile including one or more filtering rules, second computer readable program code devices configured to cause a computer system to establishing the identity of a network user that is using a host client system, third computer readable program code devices configured to cause a computer system to select one of more filtering profiles in accordance with the identity of the network user, and fourth computer readable program code devices configured to cause a computer system to establish a packet filter in the computer network, the packet filter using the filtering rules included in the selected profiles to selectively forward packets originating at the host client system and directed at one or more of the services included in the network.

12. A computer program product as recited in claim 11 wherein the computer network includes a router and wherein the fourth computer readable program code devices includes computer readable program code devices configured to cause a computer system to reconfigure the router to selectively forward packets originating at the host client system in accordance with the filtering rules included in the selected profiles.

13. A computer program product as recited in claim 11 wherein the host client system is connected to the network using a cable modem and wherein the fourth computer readable program code devices includes computer readable program code devices configured to cause a computer system to reconfigure the cable modem to selectively forward packets originating at the host client system in accordance with the filtering rules included in the selected profiles.

14. A computer program product as recited in claim 8 wherein the third computer readable program code devices includes computer readable program code devices configured to cause a computer system to select the filtering profiles from a database.

15. An apparatus for providing access control to services in a computer network including one or more server systems and one or more client systems, the apparatus comprising:

a filtering profile for each service, each filtering profile including one or more filtering rules, a first portion configured to cause a computer system to establish the identity of a network user that is using a host client system, a second portion configured to cause a computer system to select one of more filtering profiles in accordance with the identity of the network user, and a third portion configured to cause a computer system to establish a packet filter in the computer network, the packet filter using the filtering rules included in the selected profiles to selectively forward packets originating at the host client system and directed at one or more of the services included in the network.

16. An apparatus as recited in claim 15 wherein the computer network includes a router and wherein the third portion includes a fourth portion configured to cause a computer system to reconfigure the router to selectively forward packets originating at the host client system in accordance with the filtering rules included in the selected profiles.

17. An apparatus as recited in claim 15 wherein the host client system is connected to the network using a cable modem and wherein the third portion includes a fourth portion configured to cause a computer system to reconfigure the cable modem to selectively forward packets originating at the host client system in accordance with the filtering rules included in the selected profiles.

18. An apparatus as recited in claim 15 wherein the second portion includes a fifth portion configured to cause a computer system to select the filtering profiles from a database.

* * * * *